United States Patent
Nakanishi et al.

(10) Patent No.: US 10,150,469 B2
(45) Date of Patent: Dec. 11, 2018

(54) CONTROL DEVICE FOR VEHICLE

(71) Applicant: TOYOTA JIDOSHA KABUSHIKI KAISHA, Toyota-shi, Aichi-ken (JP)

(72) Inventors: Naoki Nakanishi, Nagoya (JP); Takahiko Tsutsumi, Nisshin (JP); Youji Takanami, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/478,604

(22) Filed: Apr. 4, 2017

(65) Prior Publication Data
US 2017/0297561 A1 Oct. 19, 2017

(30) Foreign Application Priority Data
Apr. 13, 2016 (JP) .................. 2016-080222

(51) Int. Cl.
| | |
|---|---|
| *B60W 10/08* | (2006.01) |
| *B60W 10/02* | (2006.01) |
| *B60W 20/00* | (2016.01) |
| *B60W 20/40* | (2016.01) |
| *B60K 6/48* | (2007.10) |
| *B60W 10/06* | (2006.01) |
| *B60W 30/20* | (2006.01) |
| *F02N 11/00* | (2006.01) |
| *F02N 99/00* | (2010.01) |
| *F02D 41/06* | (2006.01) |
| *F02N 11/08* | (2006.01) |

(Continued)

(52) U.S. Cl.
CPC .............. *B60W 20/40* (2013.01); *B60K 6/48* (2013.01); *B60W 10/02* (2013.01); *B60W 10/06* (2013.01); *B60W 10/08* (2013.01); *B60W 30/20* (2013.01); *F02D 41/065* (2013.01); *F02N 11/00* (2013.01); *F02N 11/0803* (2013.01); *F02N 99/006* (2013.01); *B60W 2050/0083* (2013.01); *B60W 2050/0089* (2013.01); *B60W 2510/081* (2013.01); *F02D 2200/101* (2013.01); *F02N 11/04* (2013.01); *F02N 2011/0896* (2013.01); *F02N 2200/022* (2013.01); *F02N 2200/041* (2013.01); *F02N 2300/104* (2013.01); *F02N 2300/2011* (2013.01); *Y02T 10/6286* (2013.01)

(58) Field of Classification Search
CPC .... B60W 20/40; F02D 41/065; F02N 11/0803
See application file for complete search history.

(56) References Cited

U.S. PATENT DOCUMENTS

| | | |
|---|---|---|
| 2011/0029174 A1 | 2/2011 | Schenk |
| 2011/0035085 A1 | 2/2011 | Falkenstein |

(Continued)

FOREIGN PATENT DOCUMENTS

| | | |
|---|---|---|
| DE | 10 2008 004 366 A1 | 7/2009 |
| JP | 2012-183897 A | 9/2012 |

(Continued)

*Primary Examiner* — Adam D Tissot
(74) *Attorney, Agent, or Firm* — Oliff PLC

(57) ABSTRACT

An electronic control unit is configured to calculate an amount of divergence of an actual MG rotational speed with respect to a reference rotational speed at the start-up of an internal combustion engine, and correct a generation timing of a compensation torque at the next start-up of the internal combustion engine based on the amount of divergence.

6 Claims, 7 Drawing Sheets

(51) Int. Cl.
*B60W 50/00* (2006.01)
*F02N 11/04* (2006.01)

(56) References Cited

U.S. PATENT DOCUMENTS

2014/0094340 A1    4/2014  Yoshikawa et al.
2015/0266462 A1*   9/2015  Johri .................... B60W 10/02
                                                          701/22

FOREIGN PATENT DOCUMENTS

JP    2013-124064 A    6/2013
JP    2014-073705 A    4/2014
WO    2016/016708 A1   2/2016

* cited by examiner

CONTROL DEVICE FOR VEHICLE

INCORPORATION BY REFERENCE

The disclosure of Japanese Patent Application No. 2016-080222 filed on Apr. 13, 2016 including the specification, drawings and abstract is incorporated herein by reference in its entirety.

BACKGROUND

1. Technical Field

The present disclosure relates to a control device for a vehicle.

2. Description of Related Art

In the related art, there are known vehicles including an internal combustion engine and an electric motor capable of outputting drive power for traveling and a clutch disposed between the internal combustion engine and the electric motor (for example, refer to Japanese Patent Application Publication No. 2014-073705 (JP 2014-073705 A)). Such vehicles are configured to intermittently operate an internal combustion engine, and is able to switch between an EV traveling mode where traveling is made with drive power output from the electric motor by releasing the clutch, and an HV traveling mode where traveling is made with drive power output from the internal combustion engine by making the clutch engaged. In addition, in the HV traveling mode, an assist torque is output from the electric motor according to a traveling state.

Here, the vehicles are configured to make the clutch engaged, sliding the clutch, to raise the rotational speed of the internal combustion engine when the internal combustion engine is started during traveling when shift from the EV traveling mode to the HV traveling mode is made. In this case, a compensation torque is output from the electric motor so as to cancel a deceleration torque generated by the engagement of the clutch. That is, in order to inhibit a shock from being developed due to a torque being lost to the internal combustion engine side by the engagement of the clutch, the output from the electric motor is increased by the lost torque.

Here, for example, when responsiveness (dead time until engagement is actually started from an engagement start instruction for the clutch) varies due to aging or the like accompanying prolonged use of the clutch, the generation timing of the deceleration torque varies. Thus, since deviation occurs with respect to the generation timing of the compensation torque, there is a concern that a shock may be developed.

SUMMARY

The present disclosure provides a control device for a vehicle that can inhibit a shock from being developed at the start-up of an internal combustion engine, in view of the above problem.

Thus, according to one aspect of the present disclosure, there is provided a control device for a vehicle including an internal combustion engine and an electric motor configured to output drive power for traveling, and a clutch disposed between the internal combustion engine and the electric motor. This control device includes an electronic control unit. The electronic control unit is configured to: (i) intermittently operate the internal combustion engine, (ii) output a compensation torque from the electric motor so as to cancel a deceleration torque generated when a rotational speed of the internal combustion engine is raised by making the clutch engaged at start-up of the internal combustion engine, (iii) calculate an amount of divergence of an actual rotational speed with respect to a reference rotational speed of the electric motor at the start-up of the internal combustion engine, and (iv) execute a first correction of correcting at least one of a generation timing of the deceleration torque and a generation timing of the compensation torque at the next start-up of the internal combustion engine based on the amount of divergence.

As described above, according to the control device for a vehicle, the deviation between the generation timing of the deceleration torque and the generation timing of the compensation torque can be reduced by correcting at least one of the generation timing of the deceleration torque and the generation timing of the compensation torque such that an absolute value of the amount of divergence resulting from the deviation between the generation timing of the deceleration torque and the generation timing of the compensation torque becomes small. Hence, a shock can be inhibited from being developed at the start-up of the internal combustion engine.

Additionally, in the above control device for a vehicle, in the first correction, when the actual rotational speed is higher than the reference rotational speed, the electronic control unit is configured to: (i) make the generation timing of the deceleration torque early when the generation timing of the deceleration torque is corrected, and (ii) make the generation timing of the compensation torque late when the generation timing of the compensation torque is corrected.

As described above, according to the control device for a vehicle, the deviation between the generation timing of the deceleration torque and the generation timing of the compensation torque can be reduced by correcting the generation timing of the deceleration torque and the generation timing of the compensation torque such that these generation timings approach each other when the generation timing of the deceleration torque with respect the generation timing of the compensation torque is late.

Additionally, in the above control device for a vehicle, in the first correction, when the actual rotational speed is lower than the reference rotational speed, the electronic control unit may be configured to: (i) make the generation timing of the deceleration torque late when the generation timing of the deceleration torque is corrected, and (ii) make the generation timing of the compensation torque early when the generation timing of the compensation torque is corrected.

As described above, according to the control device for a vehicle, the deviation between the generation timing of the deceleration torque and the generation timing of the compensation torque can be reduced by correcting the generation timing of the deceleration torque and the generation timing of the compensation torque such that these generation timings approach each other when the generation timing of the deceleration torque with respect the generation timing of the compensation torque is early.

Additionally, in the above control device for a vehicle, the internal combustion engine may be provided with a fuel injection valve configured to inject fuel directly into a combustion chamber of the internal combustion engine, and the internal combustion engine may be configured to execute ignition start-up of injecting fuel from the fuel injection valve into the combustion chamber of a cylinder of the internal combustion engine, and igniting the fuel. Here, the cylinder is in a stopping state in an expansion stroke of the internal combustion engine. The electronic control unit may be configured to execute a second correction of correcting a start timing when the ignition start-up is executed at the next start-up of the internal combustion engine, based on the amount of the divergence.

As described above, according to the control device for a vehicle, the ignition start-up can be appropriately executed by correcting the start timing of the ignition start-up such that the deviation between the timing (the generation timing of the deceleration torque) when the clutch starts its engagement and the start timing of the ignition start-up decreases.

Additionally, in the above control device for a vehicle, the electronic control unit may be configured to execute correction such that the start timing of the ignition start-up is made late when the actual rotational speed is higher than the reference rotational speed, in the second correction.

As described above, according to the control device for a vehicle, the deviation between the timing when the clutch starts its engagement and the start timing of the ignition start-up can be reduced by correcting such that the start timing of the ignition start-up may approach the timing when the clutch starts its engagement.

Additionally, in the above control device for a vehicle, the electronic control unit may be configured to execute correction such that the start timing of the ignition start-up is made early when the actual rotational speed is lower than to the reference rotational speed, in the second correction.

As described above, according to the control device for a vehicle, the deviation between the timing when the clutch starts its engagement and the start timing of the ignition start-up can be reduced by correcting such that the start timing of the ignition start-up may approach the timing when the clutch starts its engagement.

Moreover, in the above control device for a vehicle, the electronic control unit may be configured to calculate the reference rotational speed by executing smoothing processing on the rotational speed of the electric motor.

As described above, according to the control device for a vehicle, the reference rotational speed of the electric motor can be calculated.

According to the control device for a vehicle of the present disclosure, a shock can be inhibited from being developed at the start-up of the internal combustion engine.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, an embodiment of the present disclosure will be described with reference to the drawings.

First, a mechanical configuration (drive system) of an vehicle 100 including an ECU 50 according to an embodiment of the present disclosure will be described with reference to FIG. 1.

Figure 1:
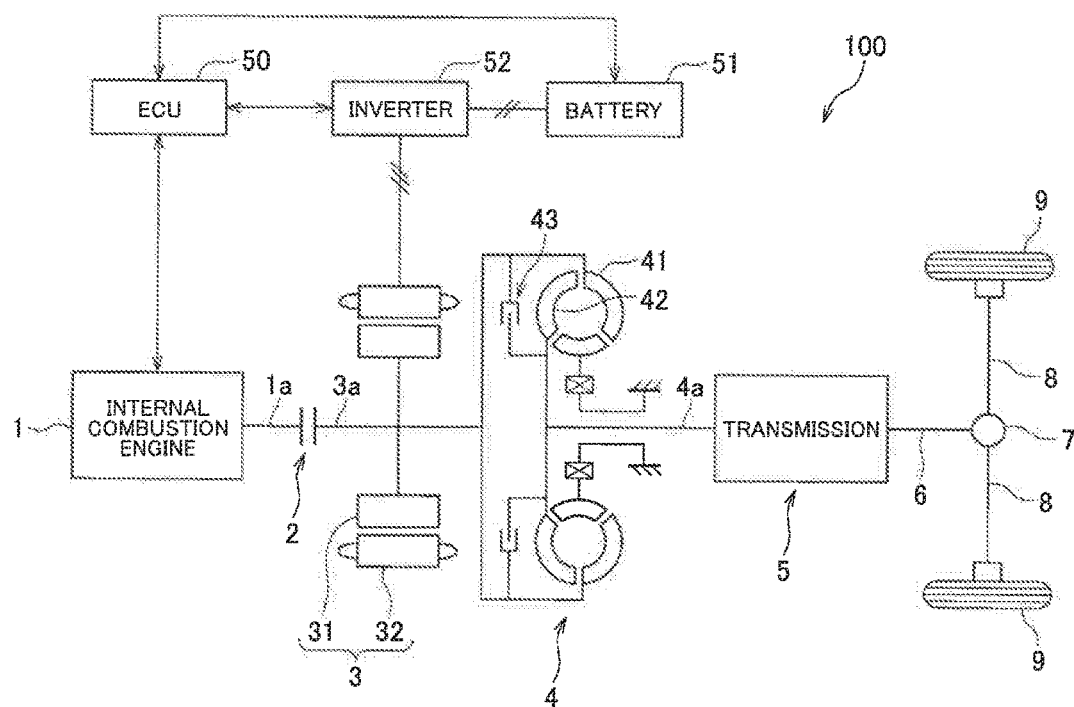
FIG. 1 is a schematic block diagram for explaining a vehicle including an ECU according to an embodiment of the present disclosure.

The vehicle 100, as illustrated in FIG. 1, includes an internal combustion engine 1, a clutch 2, a motor generator 3, a torque converter 4, and a transmission 5. The vehicle 100 is, for example, a front engine rear drive (FR) type hybrid vehicle. In addition, the motor generator 3 is an example of an "electric motor" of the present disclosure.

The internal combustion engine 1 is, for example, a multi-cylinder gasoline engine and is configured to be cable of outputting drive power for traveling. A crankshaft 1a of the internal combustion engine 1 is coupled to a rotor shaft 3a of the motor generator 3 via the clutch 2. In addition, the details of the internal combustion engine 1 will be described below.

The clutch 2 is, for example, a wet multi-plate type frictional engagement device, and is disposed between the internal combustion engine 1 and the motor generator 3. The clutch 2 is configured to selectively couple the internal combustion engine 1 and the motor generator 3 together. Specifically, when the clutch 2 is engaged, a power transmission path between the internal combustion engine 1 and a motor generator 3 are coupled, and when the clutch 2 is released, the power transmission path between the internal combustion engine 1 and a motor generator 3 is cut off. That is, when the clutch 2 is released, the internal combustion engine 1 is separated from the drive wheel (rear wheel) 9.

The motor generator 3 is configured to function as an electric motor and function as a generator. For this reason, the motor generator 3 is capable of outputting the drive power for traveling and capable of converting kinetic energy (the rotation of a rotor 31) into electrical energy to generate electric power. The motor generator 3 is, for example, an alternating current synchronous motor, and has the rotor 31 consisting of a permanent magnet, and a stator 32 around which three-phase wiring lines are wound. The rotor shaft 3a is integrally provided in the rotor 31, and the rotor shaft 3a is coupled to the torque converter 4.

The torque converter 4 has an input-side pump impeller 41, an output-side turbine runner 42, and the like, and is configured to execute power transmission via a fluid (hydraulic oil) between the pump impeller 41 and the turbine runner 42. The pump impeller 41 is coupled to the rotor shaft 3a, and the turbine runner 42 is coupled to the transmission 5 via a turbine shaft 4a. Additionally, the torque converter 4 is provided with a lock-up clutch 43, and the pump impeller 41 and the turbine runner 42 rotate integrally when the lock-up clutch 43 is engaged.

The transmission 5 is, for example, a stepped automatic transmission, has frictional engagement elements, a planetary gear, and the like, and is configured to form a plurality of shift stages by making the frictional engagement elements selectively engaged. The transmission 5, for example, is configured such that the shift stages (shift ratio) is automatically switched according to a vehicle speed and an accelerator opening degree. The output of the transmission 5 is transmitted to drive wheels 9 via a propeller shaft 6, a differential device 7, and a drive shaft 8.

Next, a schematic configuration of the internal combustion engine 1 to be mounted on the vehicle 100 will be described with reference to FIG. 2.

Figure 2:
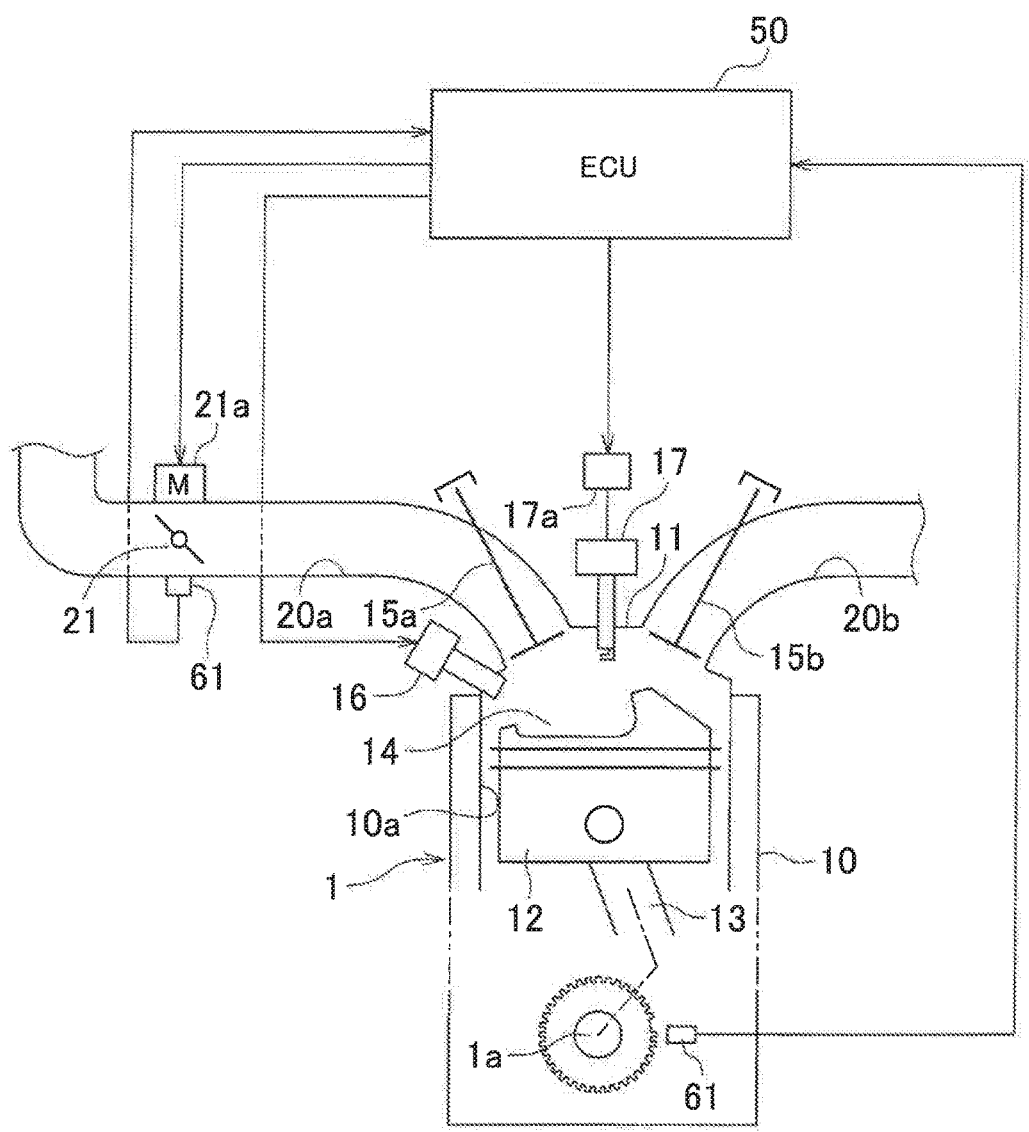
FIG. 2 is a schematic block diagram illustrating an internal combustion engine to be mounted on the vehicle of FIG. 1.

The internal combustion engine 1, as illustrated in FIG. 2, includes a cylinder block 10, and a cylinder head 11 provided at an upper part of the cylinder block 10. The internal combustion engine 1 is, for example, a direct injection type four-stroke engine. In addition, FIG. 2 illustrates only one cylinder.

Cylinder bores 10a are formed in the cylinder block 10, and a piston 12 is provided so as to be reciprocable within each cylinder bore 10a. The crankshaft 1a that is an output shaft is coupled to the piston 12 via a connecting rod 13.

A combustion chamber 14 is formed between the piston 12 within the cylinder bore 10a, and the cylinder head 11. An intake passage 20a and an exhaust passage 20b are connected to the combustion chamber 14. A throttle valve 21 or the like for adjusting the amount of intake air is disposed in the intake passage 20a. The throttle valve 21 is driven by a throttle motor 21a. A three-way catalyst (not illustrated) or the like for purifying toxic substances in an exhaust gas is disposed in the exhaust passage 20b.

The cylinder head 11 is provided with an intake valve 15a for allowing the combustion chamber 14 and the intake passage 20a to communicate with each other or cut off from each other and an exhaust valve 15b for allowing the combustion chamber 14 and the exhaust passage 20b to communicate with each other or cut off from each other. Additionally, the cylinder head 11 is provided with an injector (fuel injection valve) 16 that injects fuel directly into the combustion chamber 14, and an ignition plug 17. The ignition timing of the ignition plug 17 is adjusted by an ignitor 17a.

Then, an air-fuel mixture in which that air and fuel are mixed together within the combustion chamber 14 is formed by directly injecting the fuel into the combustion chamber 14 from the injector 16. This air-fuel mixture is ignited by the ignition plug 17 and is combusted and exploded. When the piston 12 is reciprocated by a combustion gas generated in this case, the crankshaft 1a is rotated and the drive power (output torque) of the internal combustion engine 1 is obtained.

Figure 3:
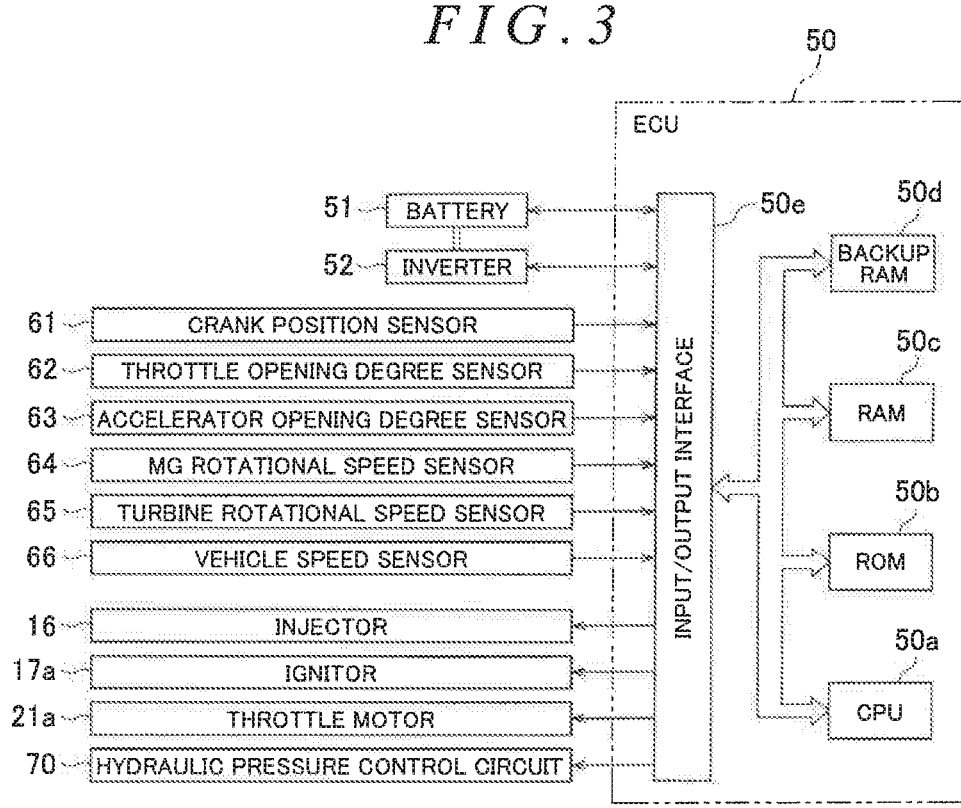
FIG. 3 is a block diagram illustrating an electrical configuration of the vehicle of FIG. 1.

Next, an electrical configuration (control system) of the vehicle 100 will be described with reference to FIG. 3.

The vehicle 100 includes the ECU 50, a battery 51, and an inverter 52.

The ECU 50 is configured to control the vehicle 100. The ECU 50, as illustrated in FIG. 3, includes a CPU 50a, a ROM 50b, a RAM 50c, a backup RAM 50d, and an input/output interface 50e, and these are connected together via buses. In addition, when the CPU 50a executes a program stored in the ROM 50b, "calculation means", "first correction means", and "second correction means" of the present disclosure are realized.

The CPU 50a executes calculation processing based on various control programs and maps that are stored in the ROM 50b. The various control programs, the maps referred to when executing these various control programs, and the like are stored in the ROM 50b. The RAM 50c is a memory that temporarily stores calculation results obtained by the CPU 50a, detection results of respective sensors, and the like. The backup RAM 50d is a nonvolatile memory that stores data or the like that should be saved when stopping a vehicle system.

The input/output interface 50e has a function of inputting the detection results or the like of the respective sensors and outputting control signals or the like to respective parts (units). A crank position sensor 61, a throttle opening degree sensor 62, an accelerator opening degree sensor 63, an MG rotational speed sensor 64, a turbine rotational speed sensor 65, a vehicle speed sensor 66, and the like are connected to the input/output interface 50e. Then, the ECU 50 calculates the rotational position (crank angle) of the crankshaft 1a, a rotational speed (engine speed) per unit time of the crankshaft 1a, the opening degree (throttle opening degree) of the throttle valve 21, the accelerator opening degree that is the amount of operation of an accelerator pedal, a rotational speed (MG rotational speed) per unit time of the rotor shaft 3a, a rotational speed (turbine rotational speed) per unit time of the turbine shaft 4a, the vehicle speed, and the like, based on detection results or the like of the respective sensors.

Additionally, the injector 16, the ignitor 17a, and the throttle motor 21a are connected to the input/output interface 50e. Then, the ECU 50 is configured to control the operational state of the internal combustion engine 1 by controlling the amount of fuel injection, an ignition timing, a throttle opening degree (the amount of intake air), and the like, based on the detection results or the like of the respective sensors.

Additionally, a hydraulic pressure control circuit 70 is connected to the input/output interface 50e. Then, the ECU 50 is configured to execute engagement/release control of the clutch 2, engagement/release control of the lock-up clutch 43, switching control of the shift stage of the transmission 5, and the like by adjusting hydraulic pressure output from the hydraulic pressure control circuit 70. In the engagement/release control of the clutch 2, it is possible to adjust the torque capacity of the clutch 2 by adjusting hydraulic pressure supplied to an actuator (not illustrated) that controls the clutch 2 with a solenoid valve (not illustrated) of the hydraulic pressure control circuit 70.

Additionally, the battery 51 and the inverter 52 are connected to the input/output interface 50e. The battery 51 is a chargeable/dischargeable power storage device, and is configured to supply the power of driving the motor generator 3 and store the electric power generated by the motor generator 3. The inverter 52 is, for example, a three-phase bridge circuit that has an IGBT and a diode, and powering control or power generation control is executed by controlling the ON/OFF state of the IGBT with a drive signal supplied from the ECU 50. Specifically, the inverter 52 converts a direct current supplied from the battery 51 into an alternating current to drive the motor generator 3 (powering control), and convert an alternating current generated by the motor generator 3 into a direct current to output the converted direct current to the battery 51 (power generation control).

Next, the traveling modes of the vehicle 100 will be described. The vehicle 100 is configured to be switchable between an EV traveling mode and an HV traveling mode.

In the EV traveling mode, traveling is executed only with the drive power of the motor generator 3 by releasing the clutch 2, and outputting drive power from the motor generator 3 in a state where the operation of the internal combustion engine 1 is stopped. In addition, at the time of braking, electric power can be generated by the motor generator 3.

In the HV traveling mode, traveling is executed by operating the internal combustion engine 1 with drive power output from the internal combustion engine 1 in a state where the clutch 2 is engaged. In this case, it is also possible to output the drive power for traveling (assist torque) from the motor generator 3 or to generate electric power with the motor generator 3.

That is, the vehicle 100 is configured to intermittently operate the internal combustion engine 1 according to a traveling state or the like.

Next, start-up of the internal combustion engine during vehicle traveling will be described. Here, the vehicle 100 is configured to make the clutch 2 engaged, sliding the clutch 2, to raise the engine speed when the internal combustion engine 1 is started during traveling when shift from the EV traveling mode to the HV traveling mode is made. In this case, a compensation torque is output from the motor generator 3 so as to cancel a deceleration torque generated by the engagement of the clutch 2. That is, in order to inhibit a shock from being developed due to a torque being lost to the internal combustion engine 1 side by the engagement of the clutch 2, the output from the motor generator 3 is increased by the lost torque.

Then, for example, when responsiveness (dead time until engagement is actually started from an engagement start instruction for the clutch 2) varies due to aging or the like accompanying prolonged use of the clutch 2, the generation timing of the deceleration torque varies. Thus, since deviation occurs with respect to the generation timing of the compensation torque, there is a concern that a shock may be developed. Thus, the ECU 50 of the present embodiment is configured such that the deviation between the generation timing of the deceleration torque and the generation timing of the compensation torque decreases and the generation timing of the compensation torque is corrected.

Additionally, as methods of starting up the internal combustion engine 1 during the traveling of the vehicle 100, for example, there are a first start-up method and a second start-up method. In the first start-up method, after the engine speed is raised by making the clutch 2 engaged at a predetermined rotational speed at which perfect explosion is possible, fuel injection and ignition are started. The second start-up method is the so-called ignition start-up, and starts fuel injection and ignition from the beginning when the clutch 2 is engaged and the internal combustion engine 1 starts its rotation. In the ignition start-up, drive power is output from the start of the rotation by injecting fuel from an injector 16 into the combustion chamber 14 of a cylinder that is stopping in an expansion stroke where both the intake valve 15a and the exhaust valve 15b are closed, and igniting the fuel, thereby executing combustion and explosion in the cylinder. In this second start-up method (ignition start-up), compared to the first start-up method, the compensation torque from the motor generator 3 required at the start-up of the internal combustion engine 1 can be reduced. Thus, it is possible to expand the operating range where traveling is possible in the EV traveling mode. In addition, the methods of starting up the internal combustion engine 1 during vehicle traveling are selected, for example, according to the state or the like of the vehicle 100.

Then, when the ignition start-up is executed, if deviation occurs between the timing (the generation timing of the deceleration torque) when the clutch 2 starts its engagement, and the start timing of the ignition start-up, there is a concern that combustion conditions may deteriorate or the engine speed may be lost. Thus, the ECU 50 is configured to correct the start timing of the ignition start-up such that the deviation between a timing when the clutch 2 starts its engagement and the start timing of the ignition start-up decreases.

Figure 4:
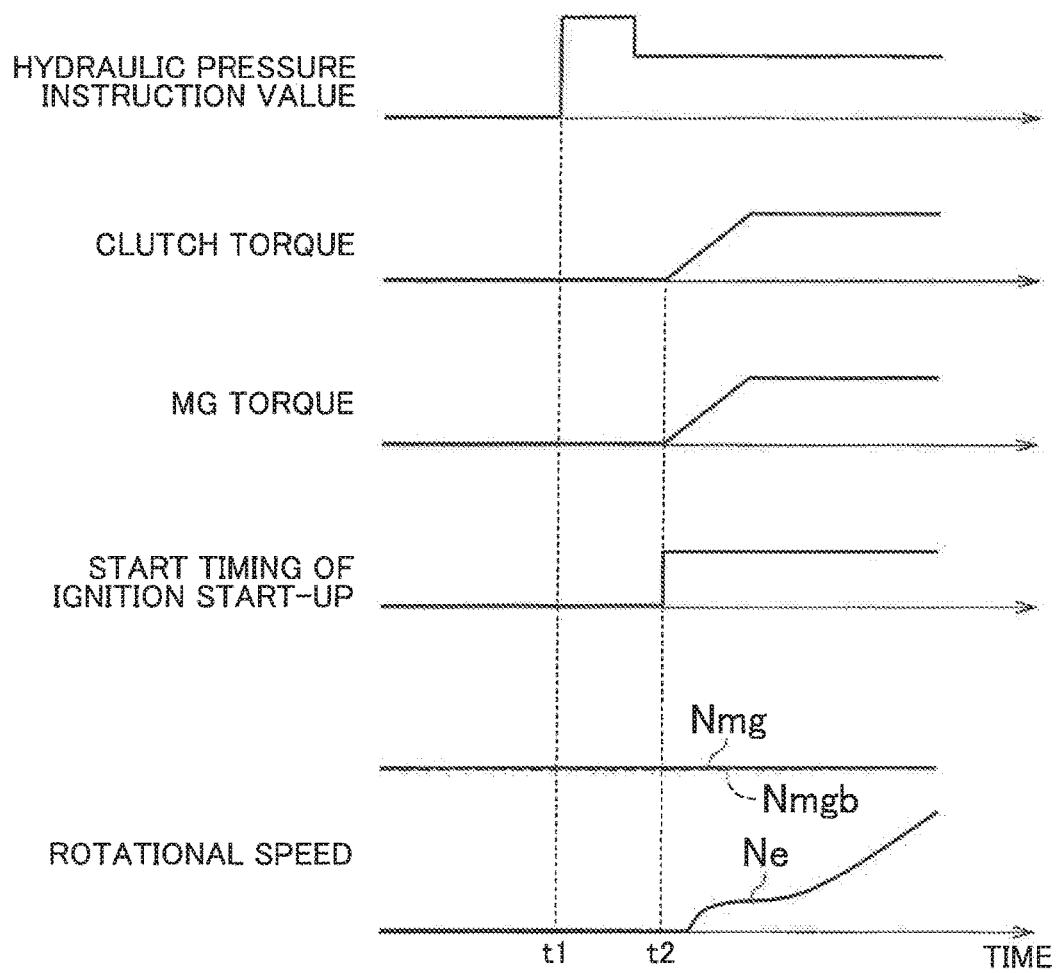
FIG. 4 is a timing chart when the rising timing of an MG torque and the start timing of the ignition start-up are ideal with respect to the rising timing of a clutch torque at the start-up of the internal combustion engine during the traveling of the vehicle.
Figure 5:
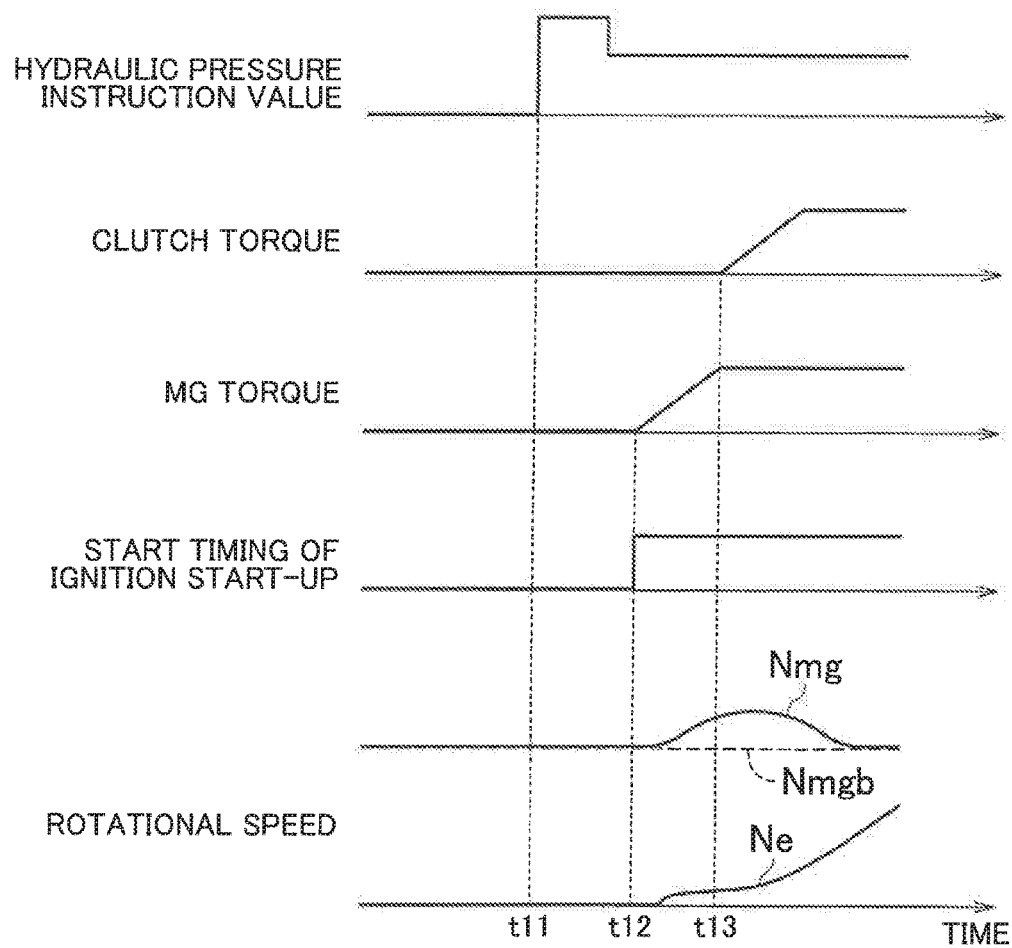
FIG. 5 is a timing chart when the rising timing of the MG torque and the start timing of the ignition start-up are early with respect to the rising timing of the clutch torque at the start-up of the internal combustion engine during the traveling of the vehicle.
Figure 6:
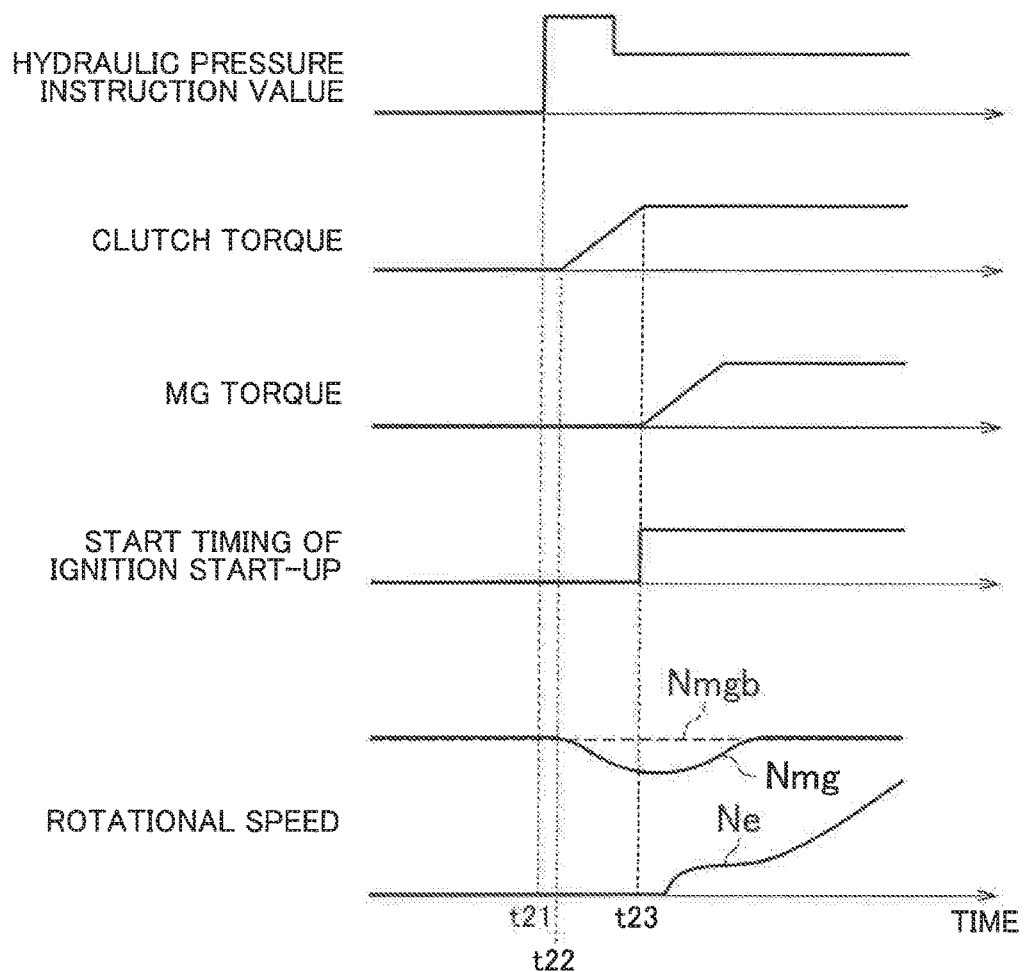
FIG. 6 is a timing chart when the rising timing of the MG torque and the start timing of the ignition start-up are late with respect to the rising timing of the clutch torque at the start-up of the internal combustion engine during the traveling of the vehicle.

FIGS. 4 to 6 illustrate examples of the timing charts at the start-up of the internal combustion engine 1 during the traveling of the vehicle 100. Next, operation examples at the start-up of the internal combustion engine 1 during the traveling of the vehicle 100 will be described with reference to FIGS. 4 to 6.

In addition, an instruction value of the hydraulic pressure supplied to the actuator of the clutch 2, a clutch torque that is the torque capacity of the clutch 2, an MG torque that is an output torque from the motor generator 3, the start timing of the ignition start-up, the rotational speed per unit time of the internal combustion engine 1 (engine speed Ne), and the rotational speed per unit time of the motor generator 3 (MG rotational speed Nmg) are illustrated in FIGS. 4 to 6. In FIGS. 4 to 6, since the internal combustion engine 1 is dragged if the clutch torque is generated, and the deceleration torque (negative torque) corresponding the clutch torque are generated. Additionally, in FIGS. 4 to 6, the MG torque is equivalent to the compensation torque.

Additionally, FIG. 4 illustrates a case where the rising timing of the MG torque and the start timing of the ignition start-up are ideal with respect to the rising timing of the clutch torque. Additionally, FIG. 5 illustrates a case where the rising timing of the MG torque and the start timing of the ignition start-up are early (hereinafter referred to as a "case where timing is early") with respect to the rising timing of the clutch torque. Additionally, FIG. 6 illustrates a case where the rising timing of the MG torque and the start timing of the ignition start-up are late (hereinafter referred to as a "case where timing is late") with respect to the rising timing of the clutch torque.

Next, a case, where rising timing of MG torque and start timing of ignition start-up are ideal with respect to rising timing of clutch torque, is explained.

First, the mode before the start-up of the internal combustion engine 1 during vehicle traveling, is the EV traveling mode. In this mode, the clutch 2 is released and the operation of the internal combustion engine 1 is stopped. Additionally, the lock-up clutch 43 of the torque converter 4 slips. In addition, in the example of FIG. 4, a case where the drive power for traveling is not output from the motor generator 3 and the vehicle 100 is executing inertia traveling is illustrated. However, the vehicle 100 may travel by outputting the drive power for traveling from the motor generator 3.

Then, if the start-up of the internal combustion engine 1 is started when shift from the EV traveling mode to the HV traveling mode is made, the ECU 50 outputs an engagement start instruction for the clutch 2 at a time point t1 of FIG. 4. Specifically, in the ECU 50, a predetermined value is set as an instruction value of the hydraulic pressure supplied to the actuator of the clutch 2 after a temporarily high value for fast fill is set. This predetermined value is, for example, a preset value, and is set such that the clutch torque reaches a value required at the ignition start-up of the internal combustion engine 1. In addition, the ECU 50 controls the solenoid valve of the hydraulic pressure control circuit 70 such that the hydraulic pressure supplied to the actuator of the clutch 2 reaches a set instruction value.

Next, at a time point t2, the clutch torque rises and the MG torque rises. In addition, the clutch torque rises with a delay from the engagement start instruction (hydraulic pressure instruction), and the MG torque rises by the ECU 50 controlling the inverter 52 at the time point t2. The value (increase amount) of the MG torque output from the motor generator 3 is a preset value and is, for example, the same value as the clutch torque. In this way, when the MG torque rises simultaneously with the clutch torque, the deceleration torque caused by the engagement of the clutch 2 is cancelled by the motor generator 3. For this reason, it is possible to inhibit the MG rotational speed Nmg from fluctuating at the start-up of the internal combustion engine 1. That is, it is possible to inhibit an actual MG rotational speed Nmg from diverging with respect to a reference rotational speed Nmgb of the motor generator 3. In addition, the reference rotational speed Nmgb is calculated by executing smoothing processing (filter processing) on the MG rotational speed Nmg.

Additionally, at the time point t2, the ignition start-up is started. That is, when the ECU 50 controls the injector 16 and the ignitor 17a, fuel injection and ignition are started. By starting the ignition start-up in accordance with the rising of the clutch torque in this way, it is possible to appropriately execute the ignition start-up.

[Case where Timing is Early]

The description up to a time point t11 of FIG. 5 is the same as that of the above-described ideal case. Then, at the time point t11, the ECU 50 outputs an engagement start instruction for the clutch 2.

Next, at a time point t12, the MG torque rises, and the ignition start-up is started. Thereafter, at a time point t13, the clutch torque rises. That is, in the example of FIG. 5, the dead time after the engagement start instruction (hydraulic pressure instruction) is output until the clutch torque rises is long compared to the above-described example of FIG. 4. In this way, if the MG torque rises earlier than the clutch torque, a surplus torque is output from the motor generator 3 until the rising of the clutch torque is completed. Therefore, the lock-up clutch 43 slips and the MG rotational speed Nmg rises up. That is, the actual MG rotational speed Nmg diverges with respect to the reference rotational speed Nmgb of the motor generator 3.

A shock is developed if the divergence of the MG rotational speed Nmg with respect to the reference rotational speed Nmgb becomes large. Additionally, if the ignition start-up is started earlier than the rising of the clutch torque, the assist torque caused by the engagement of the clutch 2 becomes insufficient. As a result, there is a concern that the engine speed Ne may lost.

Thus, in this case, at the next start-up of the internal combustion engine 1, correction is made such that the rising timing of the MG torque and the start timing of the ignition start-up are made late. In addition, the start timing of the ignition start-up is start timing when the next start-up of the internal combustion engine 1 is the ignition start-up.

[Case where Timing is Late]

The description up to a time point t21 of FIG. 6 is the same as that of the above-described ideal case. Then, at the time point t21, the ECU 50 outputs an engagement start instruction for the clutch 2.

Next, at a time point t22, the clutch torque rises. Thereafter, at a time point t23, the MG torque rises, and the ignition start-up is started. That is, in the example of FIG. 6, the dead time after the engagement start instruction (hydraulic pressure instruction) is output until the clutch torque rises is short compared to the above-described example of FIG. 4. In this way, if the clutch torque rises earlier than the MG torque, the compensation torque from the motor generator 3 runs short until the rising of the MG torque is completed. Therefore, the lock-up clutch 43 slips and the MG rotational speed Nmg decreases. That is, the actual MG rotational speed Nmg diverges with respect to the reference rotational speed Nmgb of the motor generator 3.

A shock is developed if the divergence of the MG rotational speed Nmg with respect to the reference rotational speed Nmgb becomes large. Additionally, if the ignition start-up is started later than the rising of the clutch torque, there is a concern that the inside of a cylinder may reach a negative pressure and the combustion conditions may deteriorate.

Thus, in this case, at the next start-up of the internal combustion engine 1, correction is made such that the rising timing of the MG torque and the start timing of the ignition start-up are made early. In addition, the start timing of the ignition start-up is start timing when the next start-up of the internal combustion engine 1 is the ignition start-up.

Next, the learning control of the rising timing of the MG torque and the start timing of the ignition start-up will be described. The ECU 50 is configured to execute the learning control of the rising timing (the generation timing of the compensation torque) of the MG torque and the start timing of the ignition start-up. In addition, the rising timing of the MG torque and the start timing of the ignition start-up are synchronized with each other, and are corrected maintaining the synchronized state.

Specifically, the ECU 50 is configured to calculate the amount of divergence of the actual MG rotational speed Nmg with respect to the reference rotational speed Nmgb of the motor generator 3 at the start-up of the internal combustion engine 1 during vehicle traveling. This amount of divergence is, for example, an integrated value of differences between the MG rotational speed Nmg and the reference rotational speed Nmgb at the start-up of the internal combustion engine 1 during vehicle traveling. For this reason, the amount of divergence is a positive value when timing is early (refer to FIG. 5), and is a negative value when timing is late (refer to FIG. 6).

Also, the ECU 50 is configured to correct the rising timing of the MG torque and the start timing when the ignition start-up is executed, at the next start-up of the internal combustion engine 1, on the basis on the amount of divergence. In addition, when the amount of divergence is the positive value, correction is made such that the rising timing of the MG torque and the start timing when the ignition start-up is executed are made late, and when the amount of divergence is the negative value, correction is made such that the rising timing of the MG torque and the start timing when the ignition start-up is executed is made early. That is, correction is made such that an absolute value of the amount of divergence resulting from a deviation with the rising timing of the clutch torque and the rising timing of the MG torque becomes small. Additionally, the amount of correction becomes larger as the amount of divergence becomes large.

Figure 7:
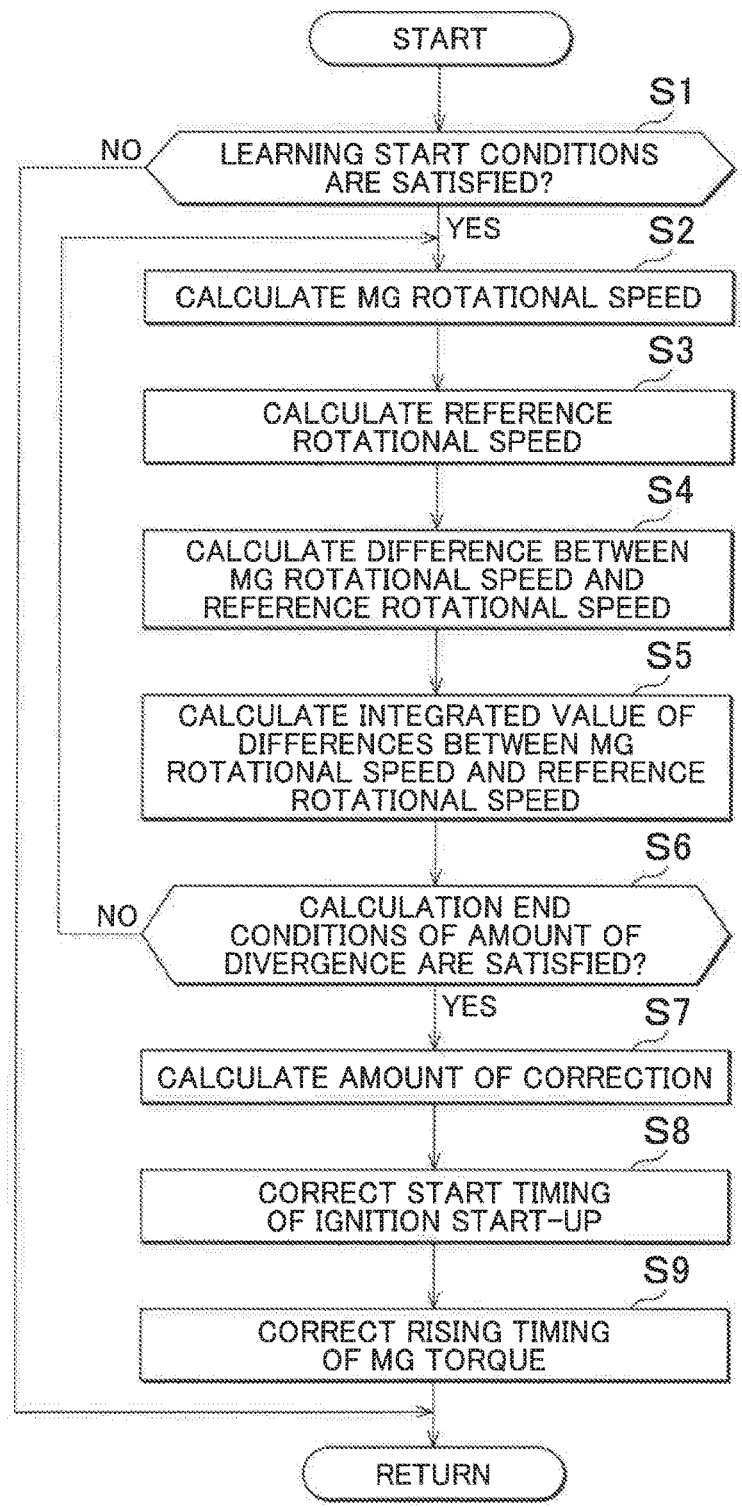
FIG. 7 is a flowchart for explaining the control of a control device of the embodiment, and is a flowchart explaining the learning control of the rising timing of the MG torque and the start timing of the ignition start-up.

FIG. 7 is a flowchart for explaining the learning control of the rising timing of the MG torque and the start timing of the ignition start-up. Next, the details of the learning control executed by the ECU 50 of the present embodiment will be described with reference to FIG. 7. In addition, the following respective steps are executed by the ECU 50.

First, in Step S1 of FIG. 7, it is determined whether or not learning start conditions are satisfied. For example, when the start-up of the internal combustion engine 1 is started during vehicle traveling and the engagement start instruction for the clutch 2 is output, it is determined that the learning start conditions are satisfied. Then, when it is determined that the learning start conditions are satisfied, the processing moves to Step S2 and the calculation of the amount of divergence is started. In addition, when it is determined that the learning start conditions are not satisfied, the processing moves to Return.

Next, in Step S2, the MG rotational speed Nmg is calculated based on a detection result of the MG rotational speed sensor 64. Then, in Step S3, the reference rotational speed Nmgb is calculated by executing the smoothing processing on the MG rotational speed Nmg. Thereafter, in Step S4, the difference (a value obtained by subtracting the reference rotational speed Nmgb from the MG rotational speed Nmg) between the MG rotational speed Nmg and the reference rotational speed Nmgb is calculated, and in Step S5, the integrated value of the differences between the MG rotational speed Nmg and the reference rotational speed Nmgb is calculated.

Next, in Step S6, it is determined whether or not calculation end conditions of the amount of divergence are satisfied. For example, when the engine speed Ne reaches the predetermined rotational speed at which the perfect explosion is possible, it is determined that the calculation end conditions are satisfied. In addition, when the engine speed Ne reaches the predetermined rotational speed at which the perfect explosion is possible, the start-up of the internal combustion engine 1 proceeds to some extent and the clutch torque and the MG torque rises. Therefore, when the rising timing of the clutch torque and the rising timing of the MG torque deviate from each other, the divergence between the MG rotational speed Nmg with respect to the reference rotational speed Nmgb already occurs due to the deviation. Then, when it is determined that the calculation end conditions of the amount of divergence are not satisfied, the processing returns to Step S2, and the calculation of the amount of divergence is continued. On the other hand, when it is determined that the calculation end conditions of the amount of divergence are satisfied, the calculation of the amount of divergence is ended, and the processing moves to Step S7. That is, Steps S2 to S5 are repeatedly executed until the calculation end conditions are satisfied, and a final integrated value (the integrated value calculated in Step S5 immediately before the calculation end conditions are satisfied) is used as the amount of divergence.

Next, in Step S7, the amount of correction is calculated by multiplying the amount of divergence by a predetermined gain.

Then, in Step S8, the start timing when the ignition start-up is executed at the next start-up of the internal combustion engine 1 is corrected. Specifically, when the next start-up of the internal combustion engine 1 is the ignition start-up, the dead time (elapsed time) from when the hydraulic pressure instruction is output until the ignition start-up is started is calculated by the following Expression (1).

$$Tig(n+1)=Tig(n)+Co \qquad (1)$$

In addition, in Expression (1), Tig (n+1) is the dead time until the ignition start-up is started when the next start-up of the internal combustion engine 1 is the ignition start-up, and Tig (n) is the dead time until the ignition start-up is started when the current start-up of the internal combustion engine 1 is the ignition start-up. Additionally, Co is the amount of correction calculated in Step S7. In addition, the correction of the dead time based on this Expression (1) is executed irrespective of whether or not the current start-up and the next start-up of the internal combustion engine 1 are the ignition start-up.

For this reason, when the rising timing of the MG torque is early with respect to the rising timing of the clutch torque and the MG rotational speed Nmg rises up (refer to FIG. 5), the amount of correction of the positive value is calculated in Step S7. Therefore, the next dead time becomes long. As a result, the start timing when the next ignition start-up is made late compared to the current start-up. Additionally, when the rising timing of the MG torque is late with respect to the rising timing of the clutch torque and the MG rotational speed Nmg decreases (refer to FIG. 6), the amount of correction of the negative value is calculated in Step S7. Therefore, the next dead time becomes short. As a result, the start timing at the next ignition start-up is made early compared to the current start-up.

Additionally, in Step S9, the rising timing of the MG torque at the next start-up of the internal combustion engine 1 is corrected. Specifically, the dead time until the MG torque rises after the hydraulic pressure instruction is output at the next start-up of the internal combustion engine 1 is calculated by the following Expression (2).

$$Tmg(n+1)=Tmg(n)+Co \qquad (2)$$

In addition, in Expression (2), Tmg (n+1) is the dead time until the MG torque at the next start-up of the internal combustion engine 1 is started, and Tmg(n) is the dead time until the MG torque at the current start-up of the internal combustion engine 1 is started. Additionally, Co is the amount of correction calculated in Step S7.

For this reason, when the rising timing of the MG torque is early with respect to the rising timing of the clutch torque and the MG rotational speed Nmg rises up (refer to FIG. 5), the amount of correction of the positive value is calculated in Step S7. Therefore, the next dead time becomes long. As a result, the rising timing of the MG torque at the next start-up is made late compared to the current rising time. Additionally, when the rising timing of the MG torque is late with respect to the rising timing of the clutch torque and the MG rotational speed Nmg decreases (refer to FIG. 6), the amount of correction of the negative value is calculated in Step S7. Therefore, the next dead time becomes short. As a result, the rising timing of the MG torque at the next start-up is made early compared to the current rising time.

Thereafter, the learning is ended, and the processing moves to Return.

In addition, since the above-described learning control is executed whenever the internal combustion engine 1 during vehicle traveling is started, the rising timing of the MG torque and the start timing when the ignition start-up is executed is gradually converged on the rising timing of the clutch torque. Additionally, even if the rising timing of the clutch torque varies, the rising timing of the MG torque and the start timing when the ignition start-up is executed follow the rising timing of the clutch torque.

In addition, when Step S5 is executed by the ECU 50, the "calculation means" of the present disclosure is realized. Additionally, when Step S8 is executed by the ECU 50, the "second correction means" of the present disclosure is realized, and when Step S9 is executed by the ECU 50, the "first correction means" of the present disclosure is realized.

Next, the effects obtained by the control of the aforementioned embodiment will be described. In the present embodiment, as described above, the generation timing of the compensation torque is corrected such that the absolute value of the amount of divergence resulting from the deviation between the generation timing of the deceleration torque and the generation timing of the compensation torque becomes small. Specifically, when the MG rotational speed Nmg rises up and the amount of divergence is the positive value (when the MG rotational speed Nmg is higher than the reference rotational speed Nmgb), the generation timing of the compensation torque is made late, and when the MG rotational speed Nmg falls and the amount of divergence is the negative value, the generation timing of the compensation torque is made early (when the MG rotational speed Nmg is lower than the reference rotational speed Nmgb). Accordingly, the deviation between the generation timing of the deceleration torque and the generation timing of the compensation torque can be reduced. Hence, a shock can be inhibited from being developed at the start-up of the internal combustion engine 1.

Additionally, in the present embodiment, when the MG rotational speed Nmg rises up and the amount of divergence is the positive value, the start timing when the ignition start-up is executed is made late, and when the MG rotational speed Nmg falls and the amount of divergence is the negative value, the start timing when the ignition start-up is executed is made early. Accordingly, the deviation between the timing (the generation timing of the deceleration torque) when the clutch 2 starts its engagement and the start timing of the ignition start-up can be reduced. Hence, the ignition start-up can be executed appropriately.

Additionally, in the present embodiment, the generation timing of the compensation torque and the start timing when the ignition start-up is executed can be made to converge on the generation timing of the deceleration torque at an early stage by making the amount of correction larger as the amount of divergence becomes larger.

Additionally, in the present embodiment, rotation fluctuations of the motor generator 3 resulting from the deviation between the generation timing of the deceleration torque and the generation timing of the compensation torque can be appropriately calculated by calculating the amount of divergence of the MG rotational speed Nmg with respect to the reference rotational speed Nmgb.

Next, another embodiment of the present disclosure will be described. In addition, the embodiment disclosed this time is illustrative in all respects, and does not become a basis of limited interpretation. Hence, the technical scope of the present disclosure is not interpreted by only the above-described embodiment, and is defined based on the statement of the claims. Additionally, all changes in meanings and scope equivalent to those of the claims are included in the technical scope of the present disclosure.

For example, although an example in which the vehicle 100 is an FR (front engine rear drive) type is illustrated in the present embodiment, the present disclosure is not limited to this, and a vehicle may be a front engine front drive (FF) type, a 4WD type, or the like.

Although an example in which the direct injection type internal combustion engine 1 capable of executing the ignition start-up is provided is illustrated in the present embodiment, the present disclosure is not limited to this, and other internal combustion engines incapable of executing the ignition start-up may be provided.

Although an example in which the wet multi-plate type clutch 2 is provided is illustrated in the present embodiment, the present disclosure is not limited to this, and other clutches, such as a dry multi-plate type clutch, may be provided.

Although an example in which the torque converter 4 is provided is illustrated in the present embodiment, the present disclosure is not limited to this, and a fluid coupling with no torque amplification may be provided instead of the torque converter.

Although an example in which the transmission 5 is the stepped automatic transmission is illustrated in the present embodiment, the present disclosure is not limited to this, and the transmission may be a non-stage transmission or the like.

Additionally, although an example in which the generation timing of the compensation torque is corrected based on the amount of divergence is illustrated in the present embodiment, the present disclosure is not limited to this, and the generation timing of the deceleration torque may be corrected based on the amount of divergence instead of the generation timing of the compensation torque. Specifically, when the MG rotational speed rises up, the generation timing of the deceleration torque is made early, and when the MG rotational speed falls, the generation timing of the deceleration torque is made late. Even in such a configuration, the deviation between the generation timing of the deceleration torque and the generation timing of the compensation torque can be reduced. In addition, the generation timing of the deceleration torque can be controlled, for example, by adjusting the hydraulic pressure instruction. Additionally, both of the generation timing of the compensation torque and the generation timing of the deceleration torque may be corrected based on the amount of divergence.

Additionally, although an example in which the integrated value of the differences between the MG rotational speed Nmg and the reference rotational speed Nmgb is used as the amount of divergence is illustrated in the present embodiment, a maximum value or the like of the differences between the MG rotational speed and the reference rotational speed may be used as the amount of divergence.

Additionally, although an example in which the reference rotational speed Nmgb is calculated by executing the smoothing processing on the MG rotational speed Nmg is illustrated in the present embodiment, the present disclosure is not limited to this, and an MG rotational speed or the like when the learning start conditions are satisfied may be used as the reference rotational speed.

Additionally, although an example in which it is determined that the learning start conditions are satisfied when the start-up of the internal combustion engine 1 is started during vehicle traveling and the engagement start instruction for the clutch 2 is output illustrated in the present embodiment, the present disclosure is not limited to this. When the start-up of the internal combustion engine is started during vehicle traveling, the engagement start instruction for the clutch is output, and the lock-up clutch of the torque converter slips, it may be determined that the learning start conditions are satisfied.

Additionally, although an example in which it is determined that the calculation end conditions of the amount of divergence are satisfied when the engine speed Ne has reached the predetermined rotational speed capable of executing the perfect explosion is illustrated in the present embodiment, the present disclosure is not limited to this. When a predetermined time has passed after the learning start conditions are satisfied, it may be determined that the calculation end conditions of the amount of divergence are satisfied. In addition, when the calculation end conditions of the amount of divergence are satisfied, the divergence of the MG rotational speed with respect to the reference rotational speed resulting from the deviation between the rising timing of the clutch torque and the rising timing of the MG torque may be converged or may not be converged.

Additionally, an example in which the rising timing of the MG torque is corrected after the start timing of the ignition start-up is corrected is illustrated in the flowchart of the present embodiment, the present disclosure is not limited to this, and the order may be reversed or may be simultaneous. That is, the flowchart of the present embodiment is an example and is not limited to the procedure.

Additionally, in the present embodiment, the ECU 50 may be configured with a hybrid (HV) ECU, an engine ECU, a motor generator (MG) ECU, a battery ECU, and the like, and these ECUs may be communicably connected to each other.

The present disclosure can be used for control devices for vehicles that control vehicles including an internal combustion engine and an electric motor capable of outputting drive power for traveling and a clutch disposed between the internal combustion engine and the electric motor.

What is claimed is:

1. A control device for a vehicle, the vehicle including an internal combustion engine and an electric motor configured to output drive power for traveling, and a clutch disposed between the internal combustion engine and the electric motor, the control device comprising:
   an electronic control unit configured to:
   (i) intermittently operate the internal combustion engine,
   (ii) output a compensation torque from the electric motor so as to cancel a deceleration torque generated when a rotational speed of the internal combustion engine is raised by making the clutch engaged at start-up of the internal combustion engine,
   (iii) calculate an amount of divergence of an actual rotational speed with respect to a reference rotational speed of the electric motor at the start-up of the internal combustion engine, and
   (iv) execute a first correction of correcting at least one of a generation timing of the deceleration torque and a generation timing of the compensation torque at the next start-up of the internal combustion engine based on the amount of divergence, wherein
   in the first correction, when the actual rotational speed is higher than the reference rotational speed, the electronic control unit is configured to:
   (a) make the generation timing of the deceleration torque early when the generation timing of the deceleration torque is corrected, and
   (b) make the generation timing of the compensation torque late when the generation timing of the compensation torque is corrected.

2. The control device according to claim 1, wherein
in the first correction, when the actual rotational speed is lower than the reference rotational speed, the electronic control unit is configured to:
   (1) make the generation timing of the deceleration torque late when the generation timing of the deceleration torque is corrected, and
   (2) make the generation timing of the compensation torque early when the generation timing of the compensation torque is corrected.

3. The control device according to claim 1, wherein
the internal combustion engine is provided with a fuel injection valve configured to inject fuel directly into a combustion chamber of the internal combustion engine, and the internal combustion engine is configured to execute ignition start-up of injecting fuel from the fuel injection valve into the combustion chamber of a cylinder of the internal combustion engine, and igniting the fuel, the cylinder being in a stopping state in an expansion stroke of the internal combustion engine, and wherein
the electronic control unit is configured to execute a second correction of correcting a start timing when the ignition start-up is executed at the next start-up of the internal combustion engine, based on the amount of the divergence.

4. The control device according to claim 3, wherein
the electronic control unit is configured to execute correction such that the start timing of the ignition start-up is made late when the actual rotational speed is higher than the reference rotational speed, in the second correction.

5. The control device according to claim 3, wherein
the electronic control unit is configured to execute correction such that the start timing of the ignition start-up is made early when the actual rotational speed is lower than the reference rotational speed, in the second correction.

6. The control device according to claim 1, wherein
the electronic control unit is configured to calculate the reference rotational speed by executing smoothing processing on the rotational speed of the electric motor.

* * * * *